US011879364B2

(12) United States Patent
Kraft et al.

(10) Patent No.: US 11,879,364 B2
(45) Date of Patent: Jan. 23, 2024

(54) GAS TURBINE EFFICIENCY AND POWER AUGMENTATION IMPROVEMENTS UTILIZING HEATED COMPRESSED AIR

(71) Applicant: POWERPHASE LLC, Jupiter, FL (US)

(72) Inventors: Robert J. Kraft, Tequesta, FL (US); Scott Auerbach, Jupiter, FL (US)

(73) Assignee: Powerphase International, LLC, Hobe Sound, FL (US)

( * ) Notice: Subject to any disclaimer, the term of this patent is extended or adjusted under 35 U.S.C. 154(b) by 0 days.

(21) Appl. No.: 16/285,822

(22) Filed: Feb. 26, 2019

(65) Prior Publication Data

US 2019/0186301 A1 Jun. 20, 2019

Related U.S. Application Data

(62) Division of application No. 14/534,347, filed on Nov. 6, 2014, now Pat. No. 10,215,060.

(51) Int. Cl.
| | |
|---|---|
| F02C 3/30 | (2006.01) |
| F01K 23/10 | (2006.01) |
| F01K 7/02 | (2006.01) |
| F02C 7/143 | (2006.01) |
| F02C 6/18 | (2006.01) |
| F01K 21/04 | (2006.01) |

(52) U.S. Cl.
CPC ............. *F01K 23/101* (2013.01); *F01K 7/02* (2013.01); *F01K 21/047* (2013.01); *F01K 23/10* (2013.01); *F02C 3/30* (2013.01); *F02C 3/305* (2013.01); *F02C 6/18* (2013.01); *F02C 7/1435* (2013.01); *F05D 2260/2322* (2013.01); *Y02E 20/16* (2013.01)

(58) Field of Classification Search
CPC ................................. F02C 3/305; F02C 7/141
See application file for complete search history.

(56) References Cited

U.S. PATENT DOCUMENTS

| | | | |
|---|---|---|---|
| 3,359,723 A | 12/1967 | Bohensky et al. | |
| 3,747,336 A * | 7/1973 | Dibelius | F02C 3/305 |
| | | | 60/39.55 |
| 3,831,373 A | 8/1974 | Flynt | |
| 4,765,142 A | 8/1988 | Nakhamkin | |

(Continued)

FOREIGN PATENT DOCUMENTS

| | | | |
|---|---|---|---|
| JP | H0613841 B2 | * | 12/1994 |
| WO | 2013116185 | | 8/2013 |

(Continued)

OTHER PUBLICATIONS

U.S. Appl. No. 14/350,469, filed Apr. 8, 2014, 141 pages.

(Continued)

*Primary Examiner* — Todd E Manahan
*Assistant Examiner* — Marc J Amar
(74) *Attorney, Agent, or Firm* — AVEK IP, LLC

(57) ABSTRACT

The present invention discloses a novel apparatus and methods for augmenting the power of a gas turbine engine, improving gas turbine engine operation, and reducing the response time necessary to meet changing demands of a power plant. Improvements in power augmentation and engine operation include systems and methods for preheating a steam injection system.

7 Claims, 5 Drawing Sheets

(56) References Cited

U.S. PATENT DOCUMENTS

| | | | |
|---|---|---|---|
| 4,785,622 A * | 11/1988 | Plumley | F02C 7/224 60/39.12 |
| 4,870,816 A | 10/1989 | Nakhamkin | |
| 4,872,307 A | 10/1989 | Nakhamkin | |
| 4,885,912 A | 12/1989 | Nakhamkin | |
| 4,893,467 A * | 1/1990 | Woodson | F01K 21/047 60/39.3 |
| 4,936,098 A | 6/1990 | Nakhamkin | |
| 4,969,324 A | 11/1990 | Woodson | |
| 5,329,758 A | 7/1994 | Urbach et al. | |
| 5,347,806 A | 9/1994 | Nakhamkin | |
| 5,369,951 A * | 12/1994 | Corbett | F01K 21/047 60/39.3 |
| 5,386,688 A | 2/1995 | Nakhamkin | |
| 5,513,488 A * | 5/1996 | Fan | F01K 21/047 60/39.59 |
| 5,540,045 A * | 7/1996 | Corbett | F01K 21/047 60/39.3 |
| 5,564,269 A * | 10/1996 | Briesch | F01K 21/042 60/39.55 |
| 5,778,675 A | 7/1998 | Nakhamkin | |
| 5,845,479 A | 12/1998 | Nakhamkin et al. | |
| 5,845,481 A | 12/1998 | Briesch | |
| 5,934,063 A | 8/1999 | Nakhamkin | |
| 5,979,156 A * | 11/1999 | Uematsu | F01K 23/10 60/39.182 |
| 6,038,849 A | 3/2000 | Nakhamkin et al. | |
| 6,134,873 A | 10/2000 | Nakhamkin et al. | |
| 6,145,294 A | 11/2000 | Traver et al. | |
| 6,212,871 B1 | 4/2001 | Rakhmailov | |
| 6,244,037 B1 | 6/2001 | Nakhamkin et al. | |
| 6,276,123 B1 | 8/2001 | Chen et al. | |
| 6,305,158 B1 | 10/2001 | Nakhamkin et al. | |
| 6,349,536 B1 * | 2/2002 | Fujioka | F02C 7/1435 60/773 |
| 6,405,521 B1 * | 6/2002 | Ranasinghe | F01K 21/047 60/39.182 |
| 6,499,303 B1 * | 12/2002 | Polukort | F01K 23/10 60/39.182 |
| 6,526,758 B2 | 3/2003 | Ranasinghe et al. | |
| 7,389,644 B1 | 6/2008 | Nakhamkin | |
| 7,406,828 B1 | 8/2008 | Nakhamkin | |
| 7,614,237 B2 | 11/2009 | Nakhamkin | |
| 7,640,643 B2 | 1/2010 | Nakhamkin | |
| 7,669,423 B2 | 3/2010 | Nakhamkin | |
| 8,011,189 B2 | 9/2011 | Nakhamkin | |
| 8,261,552 B2 | 9/2012 | Nakhamkin | |
| 8,616,005 B1 | 12/2013 | Cousino, Sr. | |
| 8,776,521 B2 | 7/2014 | Tong et al. | |
| 8,863,519 B2 | 10/2014 | Kraft | |
| 2001/0000091 A1 | 4/2001 | Nakhamkin et al. | |
| 2001/0047649 A1 * | 12/2001 | Ranasinghe | F01K 21/047 60/775 |
| 2003/0182944 A1 * | 10/2003 | Hoffman | F01K 23/10 60/772 |
| 2005/0087330 A1 | 4/2005 | Kang et al. | |
| 2007/0227154 A1 * | 10/2007 | Pelini | F02C 3/305 60/39.182 |
| 2009/0077979 A1 * | 3/2009 | Masaki | F01D 25/32 60/39.15 |
| 2009/0200805 A1 | 8/2009 | Kim et al. | |
| 2009/0320438 A1 * | 12/2009 | Koganezawa | F02C 9/16 60/39.15 |
| 2010/0186366 A1 * | 7/2010 | Doyle | F02C 3/305 60/39.53 |
| 2010/0236240 A1 * | 9/2010 | Hu | F02C 6/18 60/670 |
| 2011/0005228 A1 | 1/2011 | Yoshinari et al. | |
| 2011/0181050 A1 * | 7/2011 | Dinu | F02C 7/1435 60/773 |
| 2011/0209479 A1 * | 9/2011 | Tong | F22B 1/1815 60/646 |
| 2012/0031581 A1 | 2/2012 | Chillar et al. | |
| 2012/0036860 A1 | 2/2012 | Wettstein et al. | |
| 2013/0118178 A1 * | 5/2013 | Sabelhaus | F02C 7/232 60/39.463 |
| 2013/0186101 A1 | 7/2013 | Mundra et al. | |
| 2014/0033714 A1 | 2/2014 | Gonzalez Salazar et al. | |
| 2014/0250902 A1 | 9/2014 | Kraft | |
| 2014/0352318 A1 | 12/2014 | Kraft | |
| 2014/0366547 A1 | 12/2014 | Kraft et al. | |
| 2014/0373551 A1 | 12/2014 | Kraft et al. | |
| 2015/0159873 A1 * | 6/2015 | Melton | F01D 25/26 60/726 |
| 2015/0233296 A1 | 8/2015 | Kraft | |

FOREIGN PATENT DOCUMENTS

| | | | |
|---|---|---|---|
| WO | 2013151909 | 10/2013 | |
| WO | WO-2013151909 A1 * | 10/2013 | F02C 7/10 |
| WO | 2014055717 | 4/2014 | |
| WO | 2014066276 | 5/2014 | |

OTHER PUBLICATIONS

U.S. Appl. No. 14/351,245, filed Apr. 11, 2014, 61 pages.
U.S. Appl. No. 14/329,340, filed Jul. 11, 2014, 76 pages.
U.S. Appl. No. 14/329,433, filed Jul. 11, 2014, 80 pages.
U.S. Appl. No. 14/462,000, filed Aug. 18, 2014, 54 pages.
U.S. Appl. No. 14/534,598, filed Nov. 6, 2014, 45 pages.
U.S. Appl. No. 62/055,247, filed Sep. 25, 2014, 27 pages.
Application No. PCT/US2013/034748, filed Mar. 31, 2013, Search Report and Written Opinion, dated Jun. 28, 2013, 15 pages.
Application No. PCT/US2013/063177, filed Oct. 3, 2013, Search Report and Written Opinion, dated Feb. 28, 2014, 15 pages.
Application No. PCT/US13/65998, filed Oct. 21, 2013, Search Report and Written Opinion, dated May 19, 2014, 18 pages.
Application No. PCT/US2015/022753, filed Mar. 26, 2015, Search Report and Written Opinion, dated Aug. 14, 2015, 11 pages.
U.S. Appl. No. 14/799,913, filed Jul. 15, 2015, 50 pages.
NASA, Compressor Thermodynamics, Jun. 12, 2014, Current Version at: https://www.grc.nasa.gov/www/k-12/airplane/compth.html (Cited version obtained from Wayback Machine online), p. 2.
Notice of Allowance issued by the USPTO regarding U.S. Appl. No. 14/799,913, dated Aug. 29, 2019, 9 pages.

* cited by examiner

GAS TURBINE EFFICIENCY AND POWER AUGMENTATION IMPROVEMENTS UTILIZING HEATED COMPRESSED AIR

CROSS-REFERENCE TO RELATED APPLICATIONS

This application is a divisional of U.S. patent application Ser. No. 14/534,347, filed Nov. 6, 2014, now U.S. Pat. No. 10,215,060, the entire disclosure of which is hereby incorporated herein by reference in its entirety.

TECHNICAL FIELD

The invention relates generally to gas turbine engine power systems incorporating a power augmentation system. More specifically, improvements relating to steam power augmentation are provided.

BACKGROUND OF THE INVENTION

Currently, many gas turbine engines operating at power plants utilize steam injection systems as a low-cost form of power augmentation. Typically steam injection is considered a relatively constant process because the start-up time and shut-down time of the steam injection system is typically on the order of thirty to sixty minutes.

Some steam injection systems of the prior art have a steam bleed near the injection point so that the steam can be used to heat the steam injection pipes. As steam injection is initiated through cold pipes, the hot steam condenses and forms water which is vented through the steam vent. Steam flow is gradually increased until the pipes are sufficiently heated, at which point water no longer forms. The steam vent then closes and the system is ready to inject steam into the gas turbine engine. This heating process for the steam pipes typically takes approximately thirty minutes.

Other prior art steam injection systems heat the steam injection pipes by slowly adding steam to the steam injection pipe and any resulting water that forms is injected into the gas turbine. Since the flow rates are extremely low, as water is typically not desired to be injected through a steam injection system into the gas turbine, this process typically takes in excess of thirty minutes to complete.

Steam is typically generated at a gas turbine site to either drive a steam turbine for producing additional power or is delivered to a supplemental process, such as an adjacent manufacturing facility, or in some cases both. When steam is generated for a supplemental process, the gas turbine power plant is referred to as a cogeneration plant, or cogen plant, because it is producing two products, electricity and steam. The recipient of the steam is called the steam host. Examples of a steam host can include a manufacturing or processing plant. Most cogen plants supply both electricity and steam to the steam host and sometimes the steam requirement and power requirement are not optimally balanced, so the cogen plant has to continuously optimize and balance the steam production and gas turbine output to try to meet the steam host's demand. This is a significant challenge, and as a result, there are periods when excess steam is produced as a result of the power requirement that cannot be avoided, and in these cases, the cogen process loses efficiency.

Steam injection power augmentation systems are not typically deployed to meet short term spot market demands because they can take too long to come online and be available. For example, if there is a spike in power demand that is not expected to last long, then the steam injection power augmentation system is not advantageous to use. Additionally, steam injection systems are not considered optimal for fast-acting regulation devices due to their slow start-up speed.

A gas turbine incorporating a steam injection system in accordance with the prior art is depicted in FIG. 1. The gas turbine comprises a compressor 10 which compresses ambient air 20 to an elevated pressure and temperature and then discharges hot pressurized air into a compressor discharge case 14, or CDC. The compressor discharge case 14 is sometimes referred to as a wrapper because it houses the combustion and transition section of the gas turbine. The hot pressurized air enters the combustion chamber 12 where fuel 24 is added. The mixture of fuel and air is ignited and forms combustion gases. The hot combustion gases are directed to the turbine section 16 which produces about twice the power being consumed by the compressor and therefore, the net power is delivered to a generator 18 for the gas turbine. As the hot gases 22 exit the turbine section 16, the hot gases 22 are directed into a heat recovery steam generator (HRSG) 605, where pressurized water is turned into pressurized steam 603 which exits the HRSG 605 and is directed into a steam turbine, a steam process, or both (602). When power augmentation with steam injection is desired, the steam injection isolation valve 113 is opened, the steam injection valve 114 is partially opened and the steam vent valve 616 is opened to allow a small amount of steam to flow through the steam injection piping 601. Water is typically formed as the steam system is warmed up and the water is drained as required through the vent valve 616. When the steam pipes 601 are heated and condensation no longer forms, steam 615 flows out of the vent system, the steam vent valve 616 is closed and the steam injection valve 614 is opened to allow the desired amount of steam injection into the gas turbine.

Typically the distance between the steam injection valve 114 and the steam injection isolation valve 113 can be several hundred feet. As a result, it takes about thirty minutes for the steam injection system to preheat to a desired operating temperature. Some steam injection systems do not have the steam vent valve 616 and therefore they can take even longer to preheat because of the sensitivity to injecting water into the gas turbine as the steam injection system is started up.

SUMMARY

The current invention provides several embodiments for preheating a steam injection power augmentation system using compressed air to allow a rapid start of the steam injection system.

One aspect of the present invention relates to methods and systems that allow gas turbine systems to bleed air from the steam injection site within the gas turbine towards the source of the steam in order to preheat the steam injection piping to reduce the chance of water formation during steam injection start-up.

Another aspect of the present invention relates to methods and systems that allow gas turbine systems to bleed air from an external source of hot compressed air to the location of the steam injection near the gas turbine preheat the steam injection lines to eliminate the chance of water formation during steam injection initiation.

One embodiment of the invention relates to adding an air bleed valve on a new or existing steam injection system near the site of the steam source to allow air to backflow from the gas turbine to the site near the source of the steam.

Another embodiment of the invention relates to a system comprising a supplemental air injection system, such as a TurboPHASE system, providing hot compressed air to the gas turbine to preheat the steam injection piping.

Another advantage of the preferred embodiment is a more efficient use of steam such that excess steam being produced can now be used to reduce plant steam output while at the same time increasing plant electrical power output.

Additional advantages and features of the present invention will be set forth in part in a description which follows, and in part will become apparent to those skilled in the art upon examination of the following, or may be learned from practice of the invention. The instant invention will now be described with particular reference to the accompanying drawings.

BRIEF DESCRIPTION OF THE SEVERAL VIEWS OF THE DRAWINGS

The present invention is described in detail below with reference to the attached drawing figures, wherein.

DETAILED DESCRIPTION

The present invention is disclosed in FIGS. 2-5. An aspect common to all embodiments of the present invention is an air vent valve 112 positioned near the source of the steam injection, typically very close to the steam injection valve 114. Before steam injection is initiated, the air vent valve 112 is opened to allow air to flow through the steam injection piping, towards the steam source, and discharged into the atmosphere 156. This allows the steam injection piping to be pre-heated to increase the speed that power augmentation with the steam injection system can be started. Various embodiments for heating the steam pipes are discussed herein.

Typically, steam injection takes at least thirty minutes to initiate and achieve a desired steam injection level. With the steam system pre-heated, the steam injection system can be brought to full flow in less than three minutes. This same air bleed system can be used to purge the steam injection lines when the steam injection process is finished. Typically when the steam injection process is turned off, it is ramped down slowly, many times at a much slower pace than the start-up process. The steam flow is ramped down, because if the steam process is suddenly stopped, the steam injection piping will be full of steam and this steam will turn into water when the steam cools down. Utilizing an air purge system as disclosed herein allows the steam injection to be stopped rapidly, as the steam can be purged from the air steam lines with a process similar to the pre-heat cycle.

An additional benefit of both the pre-heat and the post purge is that the reverse flow can purge out any foreign matter that might be obstructing the steam injection system. For example, on a General Electric Frame 7FA gas turbine engine, the steam injection system has known operating issues such as plugging of the steam injection system. In this system, the steam is supplied to the gas turbine through a six inch pipe, which is a manifold to fourteen distinct combustors through a three inch pipe. Inside each combustor can there is an annulus that is approximately one inch wide by 0.75 inches tall that supplies ten steam pegs that have five holes approximately 0.030" in diameter. If a foreign matter gets in the flow of steam, it will plug these small holes in the pegs. By purging air from these small holes, any foreign matter that might be caught in them can be flushed out to atmosphere or where ever the air vent is discharging the air.

Figure 1:
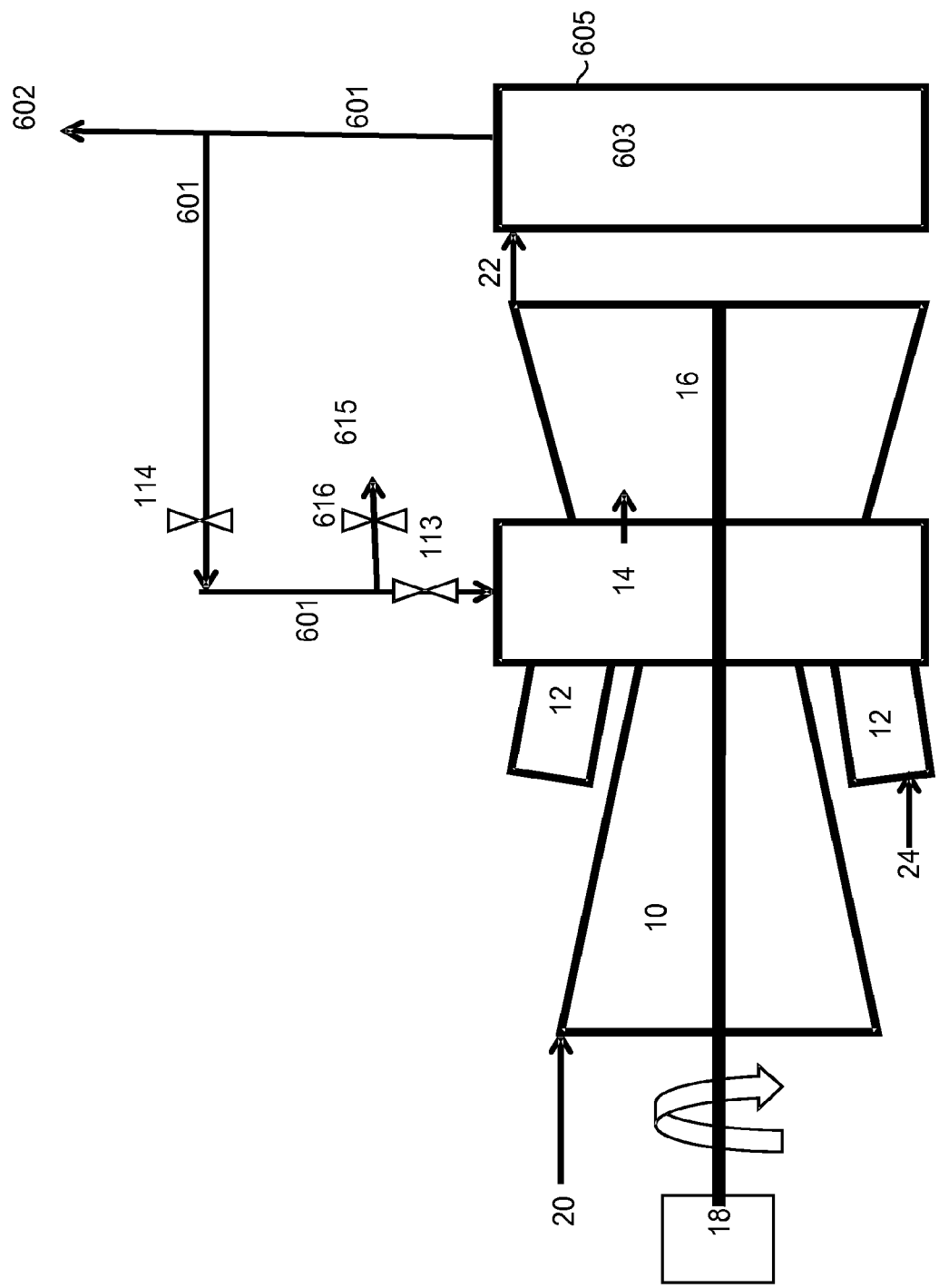
FIG. 1 is a schematic drawing of a steam injection system on a gas turbine engine of the prior art.
Figure 2:
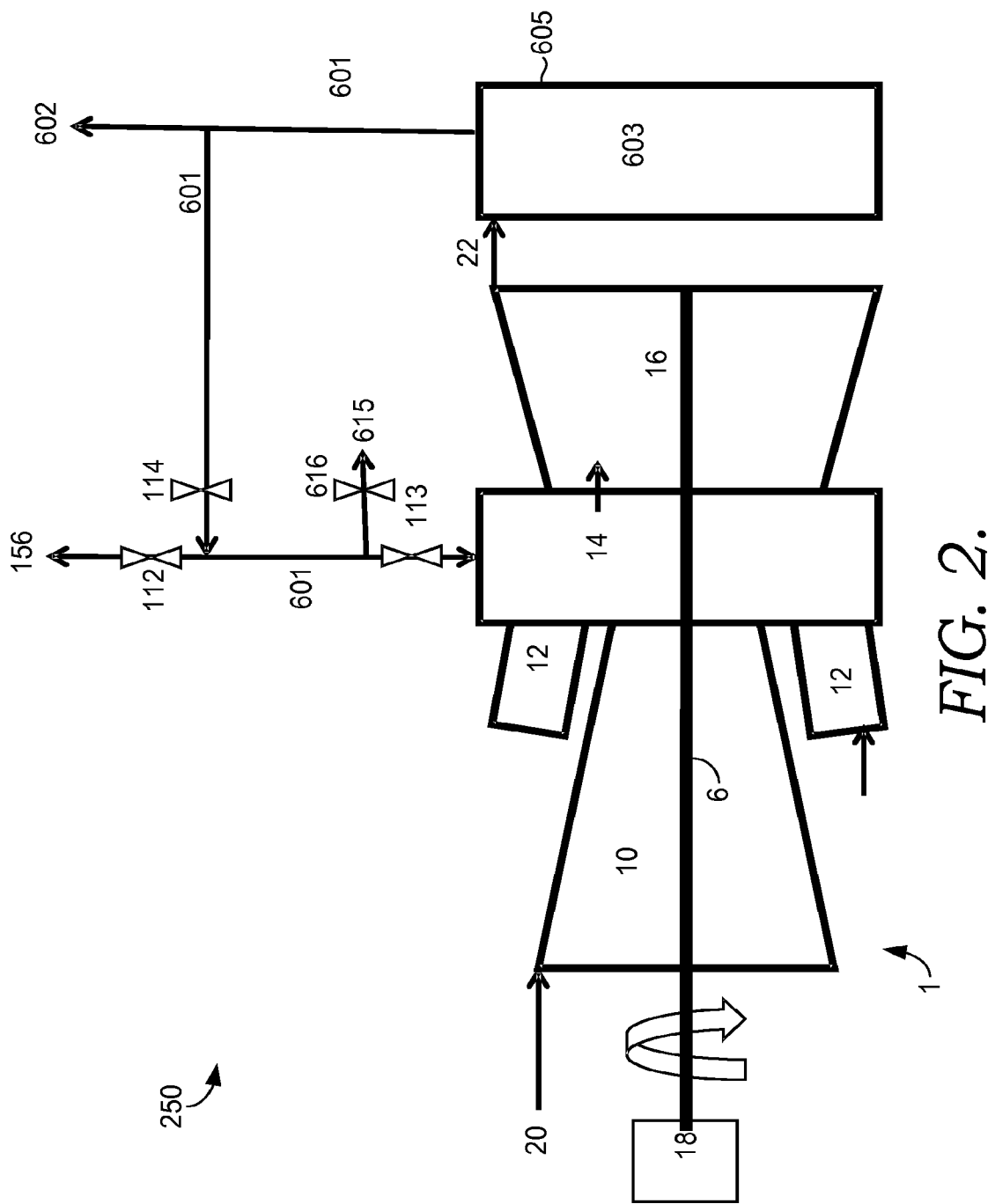
FIG. 2 is a schematic drawing of an embodiment of the present invention where an air bleed system is added to a new or existing steam injection system on a gas turbine engine.

Referring now to FIG. 2, a system for preheating a power augmentation system of a power plant is provided. The system 250 comprises a gas turbine engine 1 comprising a compressor 10 coupled to a turbine 16 by a shaft 6. The compressor 10 and turbine 16 are in fluid communication with one or more combustors 12. The system 250 also comprises a heat recovery steam generator 605, or HRSG. The HRSG 605 takes hot exhaust gases 22 from the turbine 16 and a water supply source (not shown) and generates a supply of steam 603.

The system 250 also comprises steam injection piping 601 connecting the gas turbine engine 1 to the HRSG 605. More specifically, the steam injection piping 601 comprises a steam injection valve 114 and an isolation valve 113. The system 250 also comprises an air vent 156 and air vent valve 112 that is in communication with the steam injection piping 601. As will be discussed further below, the isolation valve 113 and air vent valve 112 selectively permit the flow of compressed air from the compressor 10, and/or a compressor discharge plenum 14, through the steam injection piping 601 and to the air vent 156, thereby preheating the steam injection piping 601. The steam injection piping also includes a steam vent valve 116 for venting steam to the atmosphere through a steam vent 115 when steam is flowing.

It is important to note that the positions of the steam injection valve 114 and orientation of steam injection piping 601 is merely illustrative of an embodiment of the present invention. As such, it is envisioned that the steam injection valve 114 may be positioned closer to the HRSG 605. For example, in one embodiment is is envisioned that the steam injection piping 601 between the steam injection valve 114 and gas turbine engine 1 could be a couple hundred feet in length.

Steam 603 produced by the HRSG 605 can be used for multiple purposes. A portion of the steam 603 can be directed through steam injection piping 601, as discussed herein, for injection in the gas turbine engine 1. Alternatively, a portion of the steam 603 can be directed to an external process 602, such as for use in an adjacent manufacturing plant.

Figure 3:
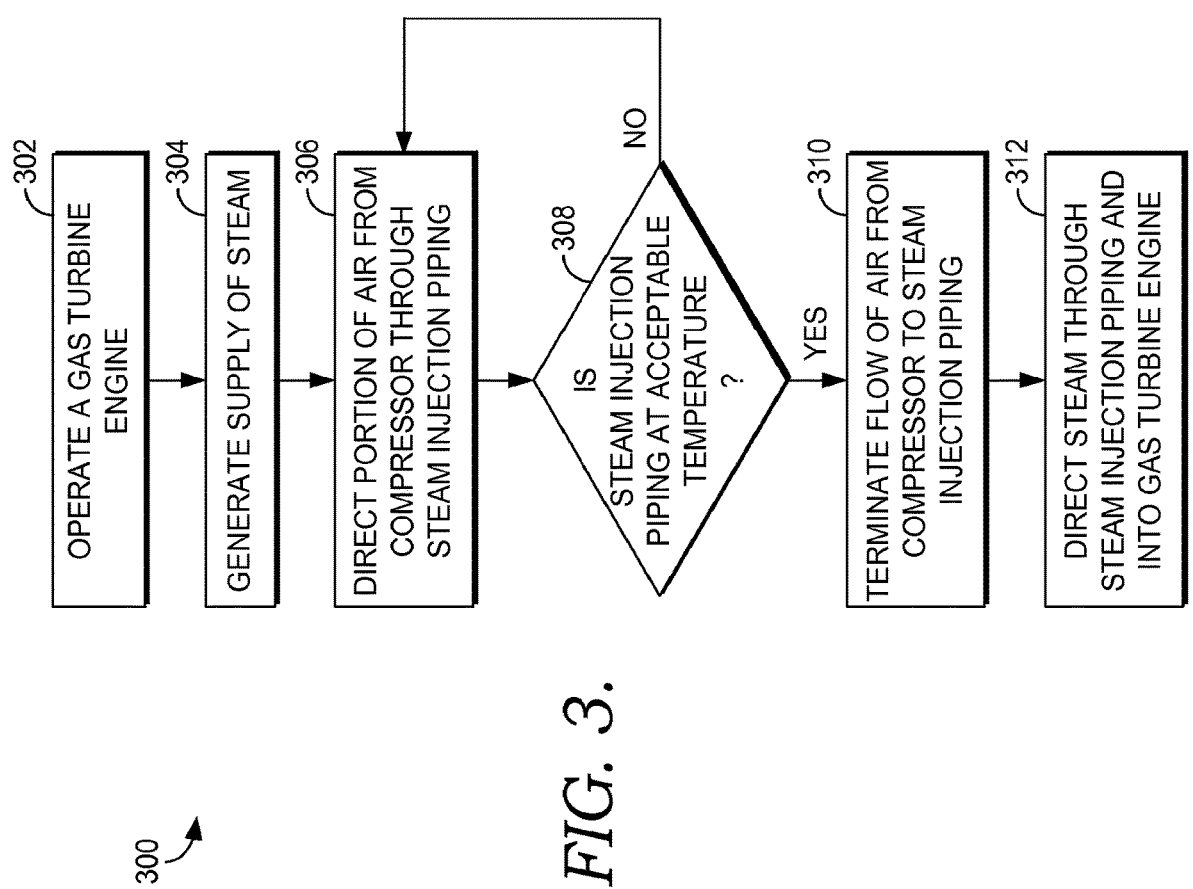
FIG. 3 is a flow diagram identifying a method of preheating a power augmentation system.

Referring now to FIG. 3, a method 300 of operating a gas turbine energy system is disclosed. In a step 302, a gas turbine engine is operated where the gas turbine engine has a compressor coupled to a turbine, and the compressor and turbine are in fluid communication with one or more combustors. A steam injection system is also in communication with the gas turbine engine where the gas turbine engine produces a heated exhaust utilized by the steam injection system for producing steam.

In a step 304, a supply of steam is generated by the heated exhaust from the gas turbine engine. Then, in a step 306, a portion of the air from the compressor, or compressor discharge plenum, is directed through at least a portion of the steam injection piping. As shown in FIG. 2, the steam injection piping utilizes an isolation valve adjacent the compressor and an air vent valve for permitting the flow of compressed air to pass from the compressor and through the steam injection piping. As a result of the flow of compressed air the temperature of the steam injection piping is increased and the piping is preheated.

In a step 308, a determination is made as to whether the steam injection piping temperature has reached an acceptable level. Generally speaking, for the Frame 7FA gas turbine engine discussed above, the steam injection piping is desired to reach approximately 500 degrees Fahrenheit. If the temperature of the steam injection piping has not reached the desired temperature, then compressed air continues to pass through the steam injection piping in order to raise the temperature of the steam injection piping. As discussed above, an isolation valve and air vent valve are opened to permit the flow of compressed air from the gas turbine engine to preheat the steam injection piping. Furthermore, once the determination is made in step 308 that the piping has reached an acceptable temperature, the air vent valve closes and steam injection valve opens, directing steam from the HRSG through the piping. Once the steam injection piping has reached its desired operating temperature, then in a step 310, the flow of air from the compressor to the piping is terminated and then in step 312, at least a portion of the steam supply is directed through the piping and into the gas turbine engine. It is understood that the use of steam and compressed air could overlap such that both fluids could be passing through the piping. Furthermore, it is possible that steam and air could be vented from the piping simultaneously.

Figure 4:
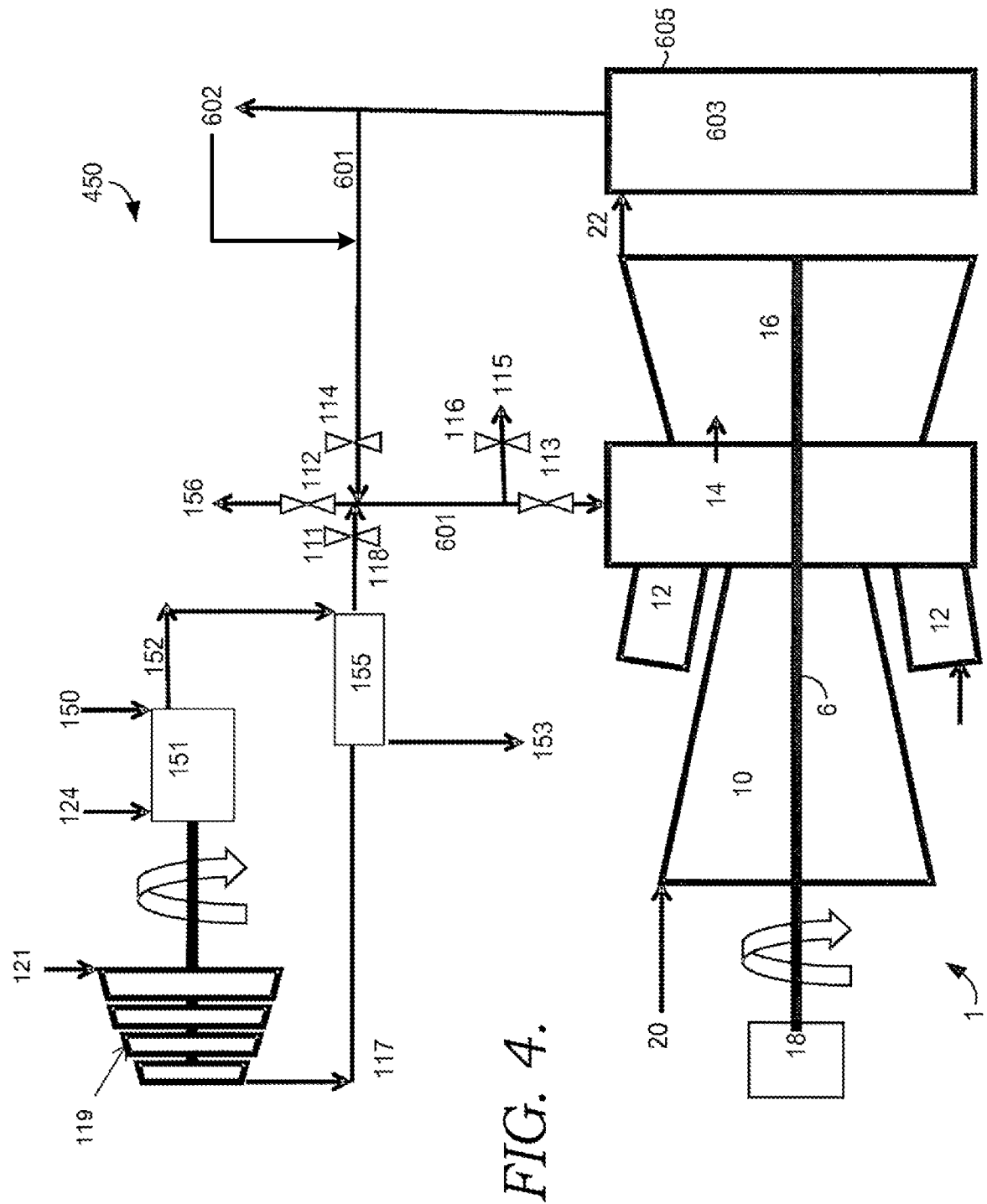
FIG. 4 is a schematic drawing of an embodiment of the present invention where a supplementary source of compressed air is used to preheat the steam injection lines.

Referring now to FIG. 4, an alternate system for preheating a power augmentation system is disclosed. The system disclosed in FIG. 4 provides an alternate source of compressed air for preheating the steam injection piping. More specifically, the system 450 comprises a gas turbine engine 1 comprising a compressor 10 coupled to a turbine 16 by a shaft 6. The compressor 10 and turbine 16 are in fluid communication with one or more combustors 12. The system 450 also comprises a heat recovery steam generator 605, or HRSG. The HRSG 605 takes hot exhaust gases 22 from the turbine 16 and a water supply source (not shown) and generates a supply of steam 603. As will be discussed below, the HRSG 605 is in selective fluid communication with the gas turbine engine 1.

The system 450 also comprises steam injection piping 601 connecting the gas turbine engine 1 to the HRSG 605. More specifically, the steam injection piping 601 comprises a steam injection valve 114, a steam vent valve 116, and an isolation valve 113. The system 250 also comprises an air vent 156 and air vent valve 112 that are in communication with the steam injection piping 601. As will be discussed further below, the isolation valve 113 and air vent valve 112 selectively permit the flow of compressed air to the steam injection piping 601, thereby preheating the steam injection piping. The steam injection piping 601 also includes a steam vent valve 116 for venting steam to the atmosphere through a steam vent 115.

It is important to note that, as with the system 250 in FIG. 2, the positions of the steam injection valve 114 and orientation of steam injection piping 601 is merely illustrative of an embodiment of the present invention. As such, it is envisioned that the steam injection valve 114 may be positioned closer to the HRSG 605. For example, in an embodiment of the present invention, steam injection piping 601 downstream of the steam injection valve 114 could be a couple hundred feet in length.

Steam 603 produced by the HRSG 605 can be used for multiple purposes. A portion of the steam 603 can be directed through steam injection piping 601, as discussed herein, for injection in the gas turbine engine 1. Alternatively, a portion of the steam 603 can be directed to an external process 602, such as for use in an adjacent manufacturing plant.

The system 450 also comprises an auxiliary source of compressed air. One such example is the TurboPHASE air injection system produced by PowerPHASE LLC of Jupiter, Fla. Such an auxiliary source of compressed air comprises a fueled engine 151 coupled to a multi-stage compressor 116. The fueled engine 151 takes ambient air 150 and fuel 124 and through its operation provides mechanical output in the form of power to drive the shaft which is coupled to compressor 116 as well as exhaust heat 152. The compressor 116 is a multi-stage intercooled compressor in which ambient air 115 is drawn into the compressor 116 and compressed to a higher pressure. After each stage of compression, the compressed air is cooled, thereby permitting further compression. After the air passes through the last stage of the intercooled compressor 116, the compressed air 117 passes into a recuperator 155. The recuperator 155 receives the compressed air 117 and exhaust heat 152 from the fueled engine 151. The temperature of the compressed air 117 increases as it passes through the recuperator 155 which is heated with the exhaust heat 152 to produce hot compressed air 118. The system 450 also comprises an air injection valve 111 located between the recuperator 155 and the steam injection piping 601. That is, upon opening of the air injection valve 111 and valve 116, heated compressed air from the auxiliary source of compressed air is directed into the steam injection piping 601. The auxiliary source of compressed air can be used to preheat the steam piping 601, inject air into the gas turbine 1, and also inject steam and air into the gas turbine.

Typically, the steam injection piping 601, which in this case is also an air injection means, is designed such that the pressure of the hot compressed air 118, or steam if it is being injected instead of air, is only about 5 to 10 psi higher than pressure in the gas turbine combustion discharge wrapper 14.

Figure 5:
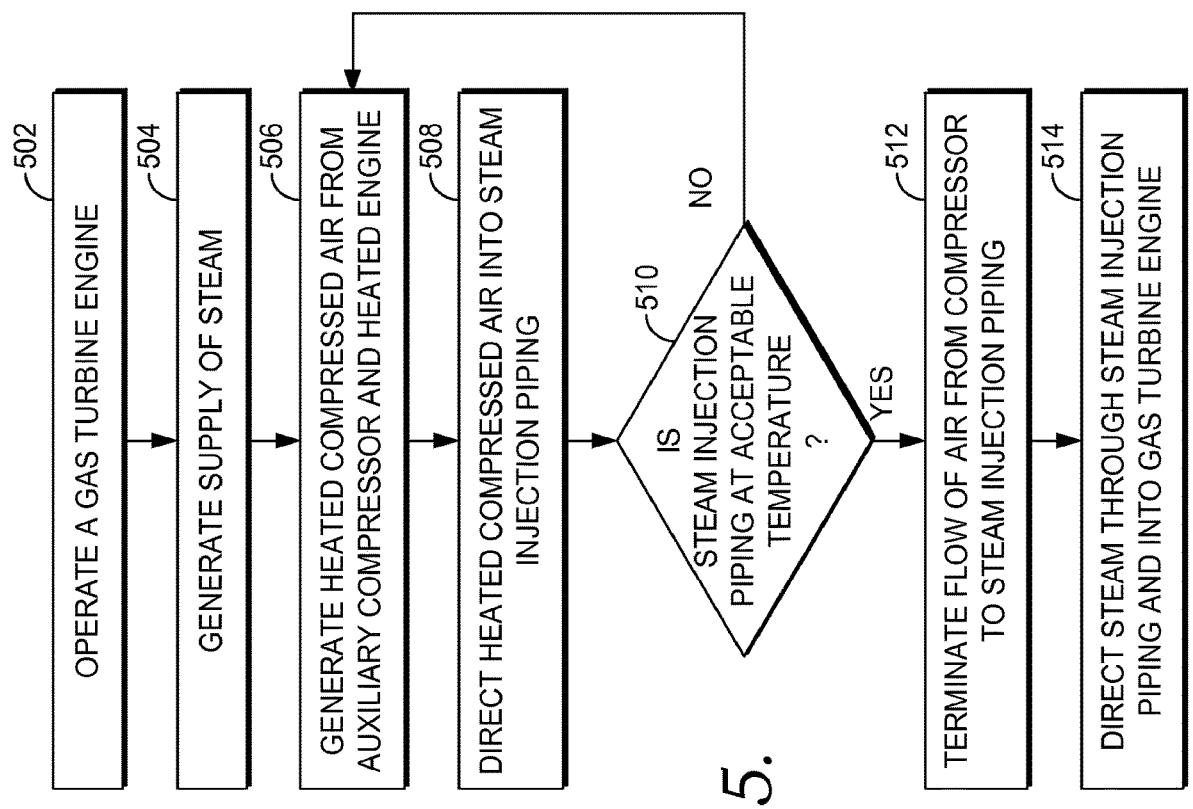
FIG. 5 is a flow diagram identifying an alternate method for preheating a power augmentation system.

Referring now to FIG. 5, an alternate method 500 of operating a gas turbine energy system is provided. The method disclosed in FIG. 5 corresponds to the system disclosed in FIG. 4. More specifically, in a step 502, a gas turbine engine is operated where the gas turbine engine has a compressor coupled to a turbine, where the compressor and turbine are in fluid communication with one or more combustors. A steam injection system is also in communication with the gas turbine engine where the gas turbine engine produces a heated exhaust utilized by the steam injection system for producing steam.

In a step 504, a supply of steam is generated by heated exhaust from the gas turbine engine. Then, in a step 506, heated compressed air from an auxiliary compressor and heated engine is generated. As shown in FIG. 4, the steam injection piping utilizes an isolation valve adjacent the compressor, an air injection valve, and an air vent valve for permitting the flow of compressed air to pass from the auxiliary source of compressed air and through the steam injection piping. As a result of the flow of compressed air the temperature of the steam injection piping is increased and the piping is preheated.

In a step 508, the heated compressed air from the auxiliary source of compressed air produced by the fueled engine and intercooled compressor is directed into the steam injection piping. Then, in a step 510, a determination is made as to whether the steam injection piping temperature has reached an acceptable level. Generally speaking, for the Frame 7FA gas turbine engine discussed above, the steam injection piping is desired to reach approximately 500 degrees Fahrenheit. If the temperature of the steam injection piping has not reached the desired temperature, then compressed air continues to pass through the steam injection piping in order to raise the temperature of the steam injection piping, as discussed with respect to step 508. Once the steam injection piping has reached its desired operating temperature, then in a step 512, the flow of air from the compressor to the piping is terminated. Once the steam injection piping is at its desired temperature, then in step 514, at least a portion of the steam supply is directed through the piping and into the gas turbine engine. As discussed above, an air injection valve and air vent valve are opened to permit the flow of compressed air from the auxiliary source of compressed air to preheat the steam injection piping. Furthermore, once the determination is made in step 510 that the piping has reached an acceptable temperature, the air vent valve closes and steam injection valve opens, directing steam from the HRSG through the piping. It is understood that the use of steam and compressed air could overlap such that both fluids could be passing through the piping. Furthermore, it is possible that steam and air could be vented from the piping simultaneously.

Typical steam injection systems utilize steam that is in a highly superheated phase because of the potential temperature drop and concern for water formation. Also, high pressure steam injection systems promote even distribution of the steam throughout the gas turbine and steam nozzles are employed at the point of injection to accomplish this. Therefore the steam that is used is in a very high energy state, typically accomplished by using higher pressure steam, typically 100 to 150 psi higher than the pressure in the gas turbine compress discharge wrapper 114. With a combined air and steam injection system, the air 118 and steam 603 would be joined together and mix as they travel through the steam piping 601 and therefore, much lower quality steam can be used to accomplish the same level of power augmentation. Typically steam quality would be lowered by utilizing lower pressure steam source, and therefore, the steam would have been able to perform useful work in the steam turbine cycle before being extracted for injection, which improves the efficiency of the steam injection system.

While the invention has been described in what is known as presently the preferred embodiment, it is to be understood that the invention is not to be limited to the disclosed embodiment but, on the contrary, is intended to cover various modifications and equivalent arrangements within the scope of the following claims. The present invention has been described in relation to particular embodiments, which are intended in all respects to be illustrative rather than restrictive.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

The invention claimed is:

1. A system for preheating a power augmentation system comprising:
a gas turbine engine comprising a compressor coupled to a turbine by a shaft, the compressor and the turbine in fluid communication with one or more combustors;
a heat recovery steam generator in fluid communication with the gas turbine engine and a steam turbine;
steam injection piping connecting the gas turbine engine to the heat recovery steam generator, the steam injection piping comprising a steam injection valve, a steam vent valve, a steam vent for venting steam from the steam vent valve to atmosphere, and an isolation valve;
an air vent and an air vent valve in communication with the steam injection piping; and,
an auxiliary source of compressed air comprising:
a fueled engine coupled to a multi-stage compressor, the fueled engine configured to produce exhaust heat;
a recuperator receiving compressed air from the multi-stage compressor and configured to heat the compressed air with the exhaust heat;
an air injection valve located between the recuperator and the steam injection piping; and,
an operating mode wherein the steam injection valve, the air injection valve, and the isolation valve direct a first portion of a collective flow and a second portion of the collective flow, the collective flow comprising at least a portion of each of a flow of the compressed air and a flow of steam, the first portion of the collective flow being directed into the gas turbine engine after the power augmentation system is preheated, and the second portion of the collective flow being directed through the steam vent valve;
wherein the steam turbine is arranged upstream of the steam injection valve such that the flow of steam is used to perform work in the steam turbine prior to the flow of steam mixing with the flow of compressed air.

2. The system of claim 1 further comprising a compressor discharge plenum for receiving compressed air from the compressor of the gas turbine and to which the one or more combustors are in fluid communication.

3. The system of claim 1, wherein the heat recovery steam generator utilizes heated exhaust from the gas turbine engine for the production of steam.

4. The system of claim 1, wherein the steam injection valve controls flow of steam from the heat recovery steam generator and to the steam injection piping.

5. The system of claim 1, wherein upon opening of the air injection valve and the isolation valve, heated compressed air from the auxiliary source of compressed air passes through the steam injection piping to preheat the steam injection piping.

6. The system of claim 1, wherein upon the steam injection piping reaching a predetermined temperature, the air injection valve is closed and steam injection valve and steam vent valve are opened to permit steam from the heat recovery steam generator to flow into the gas turbine engine.

7. A system for preheating a power augmentation system comprising:
a gas turbine engine comprising a compressor coupled to a turbine by a shaft, the compressor and the turbine in fluid communication with one or more combustors;
a heat recovery steam generator in selective fluid communication with the gas turbine engine;
a steam turbine in fluid communication with the gas turbine engine;
steam injection piping connecting the gas turbine engine to the heat recovery steam generator, the steam injection piping comprising a steam injection valve, a steam vent valve, a steam vent for venting steam from the steam vent valve to atmosphere, and an isolation valve;

an air vent and an air vent valve in communication with the steam injection piping; and, an auxiliary source of compressed air comprising:
- a fueled engine coupled to a multi-stage compressor, the fueled engine configured to produce exhaust heat;
- a recuperator receiving compressed air from the multi-stage compressor and configured to heat the compressed air with the exhaust heat; and,
- an air injection valve located between the recuperator and the steam injection piping;

a steam injection mode wherein the air injection valve is closed and each of the steam injection valve and the steam vent valve are opened upon the steam injection piping reaching a predetermined temperature to permit a first flow of steam from the heat recovery steam generator to flow into the gas turbine; and, a steam-air injection mode wherein the air injection valve remains open and each of the steam injection valve and the steam vent valve are opened upon the steam injection piping reaching a predetermined temperature to permit both a second flow of steam from the steam turbine and the compressed air from the multi-stage compressor to form a mixed flow and flow into the gas turbine;

wherein injection of the mixed flow in the steam-air injection mode is a more efficient use of steam than injection of the first flow in the steam injection mode.

* * * * *